United States Patent
Pannwitz et al.

(10) Patent No.: US 11,218,335 B2
(45) Date of Patent: Jan. 4, 2022

(54) TRANSMITTER/RECEIVER DEVICE FOR A BUS SYSTEM AND METHOD FOR REDUCING CONDUCTED EMISSIONS

(71) Applicant: Robert Bosch GmbH, Stuttgart (DE)

(72) Inventors: Axel Pannwitz, Radebeul (DE); Steffen Walker, Reutlingen (DE); Sebastian Stegemann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/976,201

(22) PCT Filed: Mar. 5, 2019

(86) PCT No.: PCT/EP2019/055362
§ 371 (c)(1),
(2) Date: Aug. 27, 2020

(87) PCT Pub. No.: WO2019/174957
PCT Pub. Date: Sep. 19, 2019

(65) Prior Publication Data
US 2021/0006431 A1   Jan. 7, 2021

(30) Foreign Application Priority Data

Mar. 12, 2018 (DE) .......................... 102018203672.1

(51) Int. Cl.
*H04L 12/40* (2006.01)
*H04L 12/413* (2006.01)
(Continued)

(52) U.S. Cl.
CPC .... *H04L 12/40032* (2013.01); *H04L 12/4015* (2013.01); *H04L 12/40169* (2013.01);
(Continued)

(58) Field of Classification Search
CPC ........... H04L 12/40032; H04L 12/4015; H04L 12/40169; H04L 12/413; H04L 25/08; H04L 2012/40215
See application file for complete search history.

(56) References Cited

U.S. PATENT DOCUMENTS

| 6,710,626 B1 * | 3/2004 | Buhring | G06F 13/4072 |
| | | | 326/88 |
| 2014/0156893 A1 * | 6/2014 | Monroe | G06F 13/3625 |
| | | | 710/117 |

(Continued)

FOREIGN PATENT DOCUMENTS

| CN | 101251056 A | 8/2008 |
| CN | 105340223 A | 2/2016 |

(Continued)

OTHER PUBLICATIONS

International Search Report for PCT/EP2019/055362, dated May 21, 2019.

*Primary Examiner* — Jenee Holland
(74) *Attorney, Agent, or Firm* — Norton Rose Fulbright US LLP; Gerard Messina

(57) ABSTRACT

A transmission/reception device for a bus system, and a method for reducing conducted emissions, are provided. The transmission/reception device has a transmission stage that has a first and a second transmission block, the first transmission block being configured to transmit a transmitted signal onto a first bus wire of a bus of the bus system, in which bus system exclusive, collision-free access by a subscriber station to the bus of the bus system is at least temporarily guaranteed, and the second transmission block is configured to transmit the transmitted signal onto a second bus wire of the bus; a reception stage for receiving the bus signal transferred on the bus wires; and an emissions reduction unit for controlled switching in of a capacitance unit in (Continued)

parallel with the second transmission stage in order to reduce conducted emissions of the transmission/reception device.

11 Claims, 3 Drawing Sheets

(51) Int. Cl.
  *H04L 25/08* (2006.01)
  *H04L 25/03* (2006.01)
(52) U.S. Cl.
  CPC ............ *H04L 12/413* (2013.01); *H04L 25/08* (2013.01); *H04L 2012/40215* (2013.01)

(56) References Cited

U.S. PATENT DOCUMENTS

| | | | |
|---|---|---|---|
| 2014/0280636 A1* | 9/2014 | Fredriksson | H04J 3/0652 709/206 |
| 2015/0082123 A1* | 3/2015 | Hartwich | G06F 11/073 714/768 |
| 2016/0162435 A1* | 6/2016 | Nickel | G06F 11/0745 710/106 |
| 2017/0078113 A1* | 3/2017 | Pannwitz | H03K 3/0231 |
| 2019/0272248 A1* | 9/2019 | Metzner | H04B 3/06 |

FOREIGN PATENT DOCUMENTS

| | | |
|---|---|---|
| CN | 105684369 A | 6/2016 |
| EP | 0858195 A2 | 8/1998 |
| FR | 3049416 A1 | 9/2017 |
| WO | 2010041212 A2 | 4/2010 |

\* cited by examiner

TRANSMITTER/RECEIVER DEVICE FOR A BUS SYSTEM AND METHOD FOR REDUCING CONDUCTED EMISSIONS The present invention relates to a transmission/reception device for a bus system, and to a method for reducing conducted emissions. The bus system is, in particular, a CAN and/or CAN FD bus system. The transmission/reception device is usable in particular in a CAN or CAN FD bus system, and in the transmission stage, more precisely its transmission block, an additional capacitance is switched in when necessary at the terminal for CAN_L in order to bring about a reduction in conducted emissions.

BACKGROUND INFORMATION

In a CAN bus system, messages are transferred by way of the CAN protocol and/or CAN FD protocol. The CAN bus system is utilized in particular for communication between sensors and control devices in a vehicle or in a technical production facility, etc. In a CAN FD bus system, a data transfer rate of more than 1 Mbit per second (1 Mbps) is possible, for example 2 Mbit/s, 5 Mbit/s, or any other data transfer rate greater than 1 Mbit/s, etc. Also known is a CAN HS bus system (HS=high speed), in which a data transfer rate of up to 500 kbit per second (500 kbps) is possible.

For data transfer in a CAN bus system, the present-day CAN physical layer ISO 11898-2:2016, constituting the CAN protocol specification with CAN FD, requires that predetermined parameters be complied with. Emissions, interference rejection (direct pin injection=DPI), and protection from electrostatic discharge (ESD) are discussed in addition to compliance with functional parameters.

It is problematic that the bit rate with CAN FD, of 2 Mbit/s and 5 Mbit/s, is increased by a factor of respectively 4 and 10 compared with conventional CAN at 500 kbit/s, but provision is made that the same emission limits are to be complied with for CAN FD as for CAN. This presents an enormous challenge in terms of meeting requirements for complying with parameters for conducted emissions.

Conducted emissions from CAN or CAN FD transceivers or CAN or CAN FD transmission/reception devices are measured in accordance with the 150-ohm method (IEC 61967-4, Integrated Circuits, Measurement of Electromagnetic Emissions, 150 kHz to 1 GHz—Part 4: Measurement of Conducted Emissions—1/150 Direct Coupling Method) and in accordance with IEC 62228 (EMC Evaluation of CAN Transceivers). For emissions measurement, a divided-down alternating voltage signal is evaluated on both bus lines (CAN_H and CAN_L).

The configuration for EMC measurement is stipulated in the document IEC TS 62228, Integrated Circuits—EMC Evaluation of CAN Transceivers. In this, three transmission/reception devices are operated on the same CAN bus with a shared 60-ohm terminating resistor and an outcoupling network. One of the transmission/reception devices transmits a transmitted signal; the other transmission/reception devices are in the same operating mode but do not transmit a dominant bit or a dominant signal state, so that the transmitted signals of those other transmission/reception devices are high=recessive.

An ascertained massive degradation in emission cannot, however, be eliminated by centering the influencing variables.

SUMMARY

An object of the present invention is to provide a transmission/reception device for a CAN bus system, and a method for reducing conducted emissions, which solve the problems described above above.

The object may be achieved by a transmission/reception device for a CAN bus system in accordance with an example embodiment of the present invention. The transmission/reception device encompasses: a transmission stage that has a first and a second transmission block, the first transmission block being configured to transmit a transmitted signal onto a first bus wire of a bus of the bus system, in which bus system exclusive, collision-free access by a subscriber station to the bus of the bus system is at least temporarily guaranteed, and the second transmission block is configured to transmit the transmitted signal onto a second bus wire of the bus; a reception stage for receiving the bus signal transferred on the bus wires; and an emissions reduction unit for controlled switching in of a capacitance unit in parallel with the second transmission stage in order to reduce conducted emissions of the transmission/reception device.

With the transmission/reception device described, emissions, in particular of interference radiation, are massively decreased, in particular by several dBμV. Conducted emissions are thereby reduced, and the electromagnetic compatibility (EMC) of the transmission/reception device is improved. The invention helps reduce emissions of the transmission/reception device at CAN FD bit rates, and makes a major contribution toward compliance with limit values.

An increase in the symmetry of the two bus wires in terms of their impedance can furthermore be achieved.

As a further advantage, the result of the transmission/reception device that is described is that no additional capacitance is brought onto the bus wires of a bus line for the bus. The transmission/reception device instead in fact decreases the capacitance in terms of small signals.

The effect of the transmission/reception device is particularly advantageous in the context of use of a common mode choke, which usually has an inductance value of 100 pH, since with this, particularly highly elevated radiation levels occur with a conventional transmission/reception device.

Advantageous further embodiments of the transmission/reception device in accordance with the present invention are described herein.

The capacitance unit may have a base capacitor and at least one additional capacitor, the emissions reduction unit being configured in such a way that each additional capacitor is connectable, independently of another additional capacitor, in parallel with the second transmission stage, with the result that the capacitance unit is connectable at least partly in parallel with the second transmission stage.

It is possible for the emissions reduction unit to be configured to switch in the capacitance unit at least partly in parallel with the second transmission stage, depending on whether or not a dominant state of the transmitted signal occurs.

According to a variant embodiment of the present invention, the emissions reduction unit is configured to connect the capacitance unit at least partly in parallel with the second transmission stage if the transmission/reception device is in the recessive state.

A standoff apparatus, which is smaller than a standoff apparatus that is provided in the first transmission block, can be provided in the second transmission block. The second standoff apparatus can be an N-channel standoff transistor.

According to a further variant embodiment of the present invention, the emissions reduction unit has a logic block for evaluating the transmitted signal and a signal received from the bus; and a P-channel high-voltage switch for switching on a path to an N-channel switch, which is provided for switching the additional capacitors of the capacitance unit, on or off on the basis of the evaluation result of the logic block.

The transmission/reception device may be a CAN FD transmission/reception device.

The above-described example transmission/reception device can be part of a bus system that has a bus and at least two subscriber stations that are connected to one another via the bus in such a way that they can communicate with one another. At least one of the at least two subscriber stations has an above-described transmission/reception device.

The aforementioned object may also achieved by an example method for reducing conducted emissions in accordance with the present invention. In one example embodiment of the present invention, the method is executed with a transmission/reception device for a bus system in which exclusive, collision-free access by a subscriber station to a bus of the bus system is at least temporarily guaranteed. The transmission/reception device has a transmission stage that has a first and a second transmission block; a reception stage; and an emissions reduction unit, the method having the steps of: transmitting, with the first transmission block, a transmitted signal onto a first bus wire of the bus; transmitting, with the second transmission block, the transmitted signal onto a second bus wire of the bus; receiving, with the reception stage, the bus signal transferred on the bus wires; and controlling, with the emissions reduction unit, a switching in of a capacitance unit in parallel with the second transmission stage in order to reduce conducted emissions of the transmission/reception device.

The example method offers the same advantages as those recited previously with reference to the transmission/reception device.

Further possible implementations of the present invention also encompass combinations, not explicitly described, of features of embodiments described previously or hereinafter with respect to the exemplifying embodiments. One skilled in the art will also add individual aspects as improvements or supplements to the respective basic form of the present invention based on the description herein.

BRIEF DESCRIPTION OF THE DRAWINGS

The present invention is described below in further detail on the basis of exemplifying embodiments and with reference to the figures.

In the Figures, identical or functionally identical elements are labeled with the same reference characters unless otherwise indicated.

DETAILED DESCRIPTION OF EXAMPLE EMBODIMENTS

Figure 1:
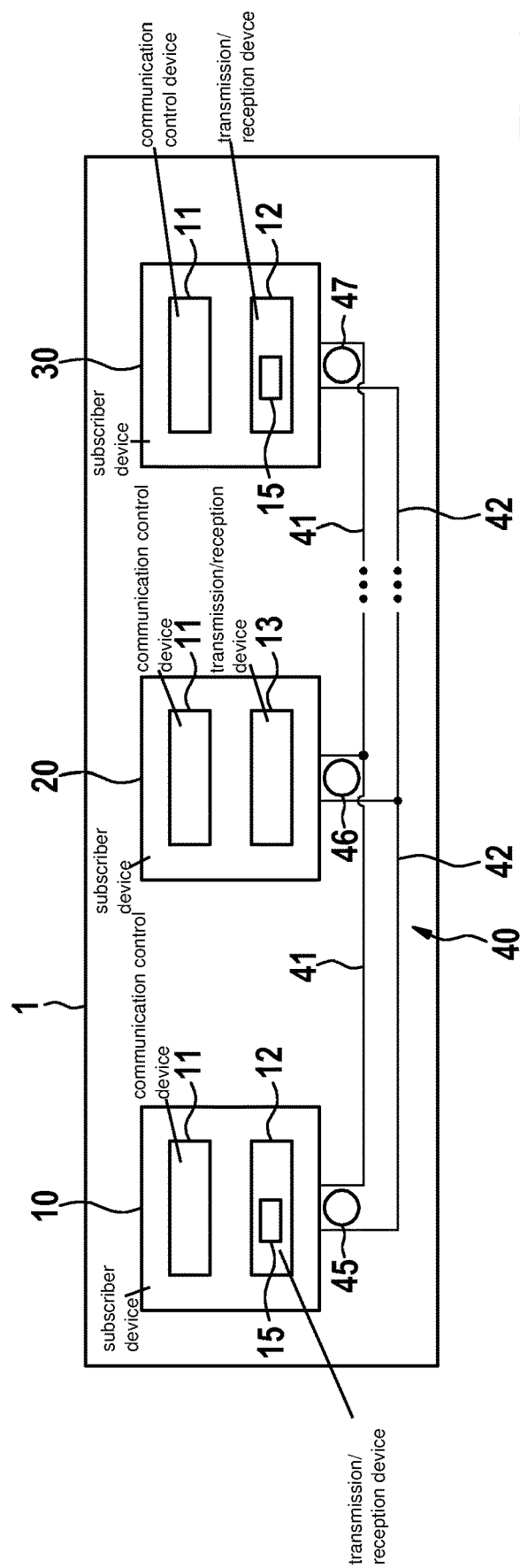
FIG. 1 is a simplified block diagram of a bus system according to a first exemplifying embodiment of the present invention.

FIG. 1 shows a bus system 1 that can be, for example, at least in portions a CAN bus system, a CAN FD bus system, etc. Very generally, bus system 1 is a serial bus system in which a bus state, in particular the dominant level of a transmitted signal, is actively driven. Bus system 1 can be utilized in a vehicle, in particular a motor vehicle, in an aircraft, etc., or in a hospital, etc.

In FIG. 1, bus system 1 has a plurality of subscriber stations 10, 20, 30 that are each connected to a bus 40 having a first bus wire 41 and a second bus wire 42. Bus wires 41, 42 are used in a CAN bus system for signals for CAN_H and CAN_L, and serve to couple in the dominant level in the transmitting state. Messages 45, 46, 47 in the form of the aforesaid signals are transferrable via bus 40 between the individual subscriber stations 10, 20, 30. Subscriber stations 10, 20, 30 can be, for example, control devices or display apparatuses of a motor vehicle.

As shown in FIG. 1, subscriber stations 10, 30 each have a communication control device 11 and a transmission/reception device 12. Transmission/reception devices 12 each encompass an emissions reduction unit 15. Subscriber station 20, conversely, has a communication control device 11 and a transmission/reception device 13. Transmission/reception devices 12 of subscriber stations 10, 30 and transmission/reception device 13 of subscriber station 20 are each connected directly to bus 40, although this is not depicted in FIG. 1.

Communication control device 11 serves to control communication of the respective subscriber station 10, 20, 30 via bus 40 with another subscriber station of subscriber stations 10, 20, 30 connected to bus 40. Transmission/reception device 12 serves to transmit and receive messages 45, 47 in the form of signals, and uses emissions reduction unit 15 in that context, as will be described below in further detail. Communication control device 11 can be embodied, for example, as a conventional CAN FD controller and/or CAN controller. Transmission/reception device 12 can otherwise be embodied in particular as a conventional CAN transceiver and/or CAN FD transceiver. Transmission/reception device 13 serves to transmit and receive messages 46 in the form of signals. Transmission/reception device 13 can otherwise be embodied as a conventional CAN transceiver.

Figure 2:
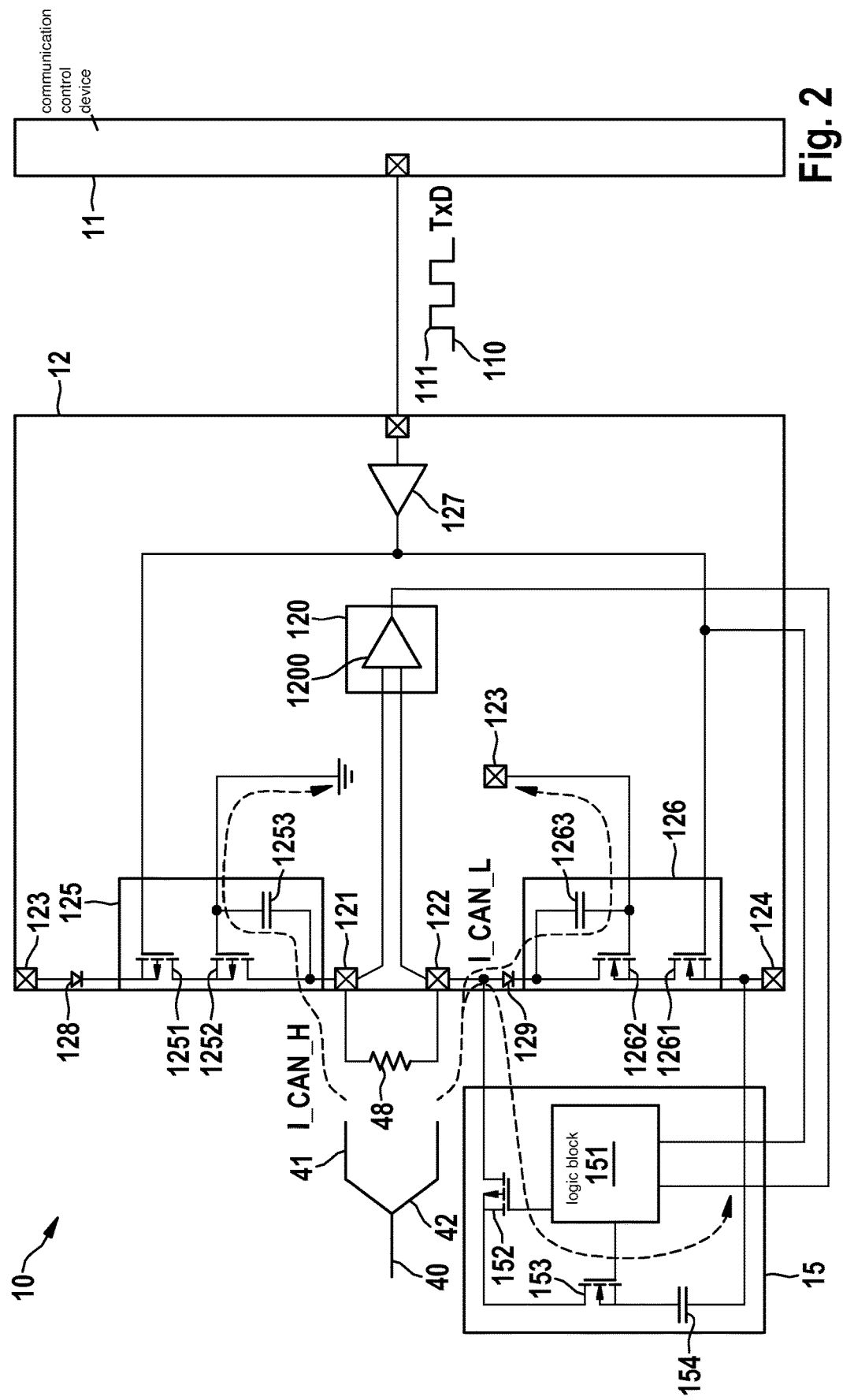
FIG. 2 is a circuit diagram of a transmission stage of a transmission/reception device in the bus system, according to the first exemplifying embodiment of the present invention.

FIG. 2 shows the basic structure of transmission/reception device 12 having emissions reduction unit 15.

Transmission/reduction unit 12 is connected at terminals 121, 122 to bus 40, more precisely to its first bus wire 41 for CAN_H and to its second bus wire 42 for CAN_L. A differential bus signal VDIFF=CAN_H−CAN_L occurs on bus 40 as a result of bus signals CAN_H, CAN_L. Bus wires 41, 42 are terminated at their ends with a terminating resistor 48, as indicated only very schematically in FIG. 2. A voltage supply, in particular a CAN supply, for first and second bus wire 41, 42 is provided at transmission/reception device 12 via at least one terminal 123. Transmission/reception device 12 is connected to ground, or CAN_GND, via a terminal 124.

First and second bus wires 41, 42 are connected at transmission/reception device 12 to a transmission stage, which is also referred to as a "transmitter" and has transmission blocks 125, 126. First and second bus wire 41, 42 are also connected to a reception stage 120, which is also referred to as a "receiver." Only the elements of the transmission stage are depicted in more detail in FIG. 2, whereas reception stage 120, with its reception comparator 1200, is depicted only very schematically because its more-detailed configuration is already known and is not necessary for an explanation of the present exemplifying embodiment.

A driver circuit 127, for driving a transmitted signal TxD that is generated by communication control device 11 and is outputted to transmission/reception device 12, is connected to transmission blocks 125, 126 and therefore to the transmission stage. Transmitted signal TxD is also referred to as a "TxD signal." Transmitted signal TxD can have different voltage states depending on the information to be conveyed, in particular a recessive state 110 or a dominant state 111.

According to FIG. 2, the transmission stage has a first transmission block 125 for the signal CAN_H for first bus wire 41, and a second transmission block 126 for the signal CAN_L for second bus wire 42. The transmission stage furthermore has a polarity protector diode 128 between terminal 123 for the voltage supply and first transmission block 125. A polarity protector diode 129 is connected between terminal 122 for second bus wire 42 and second transmission block 126.

First transmission block 125 has a low-voltage P-type metal oxide semiconductor (PMOS) transistor 125a and a P-channel high-voltage standoff transistor 1252, which are connected in series. A parasitic capacitance 1253 forms between the gate and drain of P-channel high-voltage standoff transistor 1252. Capacitance 1253 is also referred to as the "gate-drain capacitance" of P-channel high-voltage standoff transistor 1252. Capacitance 1253 thus forms between the gate of transistor 1252 and terminal 121 for first bus wire 41.

Second transmission block 126 has a low-voltage N-type metal oxide semiconductor (NMOS) transistor 1261 and an N-channel high-voltage standoff transistor 1262, which are connected in series. A parasitic capacitance 1263 forms between the gate and drain of N-channel high-voltage standoff transistor 1262. Capacitance 1263 is also referred to as the "gate-drain capacitance" of N-channel high-voltage standoff transistor 1262. Capacitance 1263 thus forms between the gate of transistor 1262 and the cathode of polarity protector diode 129, which is provided for terminal 122 for second bus wire 42.

When one of subscriber stations 20, 30 transmits a transmitted signal TxD onto bus 40, the dynamics of the signals of the transmitting subscriber stations 20, 30 causes the currents I_CAN_H and I_CAN_L in bus terminals 121, 122 of the receiving transmission/reception device 12 of subscriber station 10. The currents I_CAN_H, I_CAN_L flow principally via the parasitic gate-drain capacitances 1253, 1263 of the pertinent standoff transistors 1252, 1262 in terminals 121, 122 for the signals CAN_H and CAN_L. Without operation of emissions reduction unit 15, the current I_CAN_H in terminal 121 for bus wire 41 for the signal CAN_H during the switching operations becomes considerably higher than the current I_CAN_L that flows in terminal 122 for bus wire 42 for the signal CAN_L; the switching operations result from the changeover between the various states 111, 110 of the transmitted signal TxD. This results in different currents in an outcoupling network according to FIG. 3, and therefore in greatly elevated emission levels in the context of EMC certification.

To avoid this, according to FIG. 2 emissions reduction unit 15 is provided; this is connected on its one side to the connection between terminal 122 for the bus signal CAN_L and the anode of polarity protector diode 129, and on its other side to the connection between low-voltage NMOS transistor 1261 and terminal 124 for CAN_GND. Emissions reduction unit 15 has a logic block 151 for switching on or off a P-channel high-voltage switch 152 in the form of a transistor. Logic block 151 additionally serves to switch on or off an N-channel switch 153 in the form of an N-channel transistor. Emissions reduction unit 15 furthermore has a capacitance unit 154 that is constructed from a base capacitor (always present) having a predetermined first capacitance, and preferably at least one connectable additional capacitor having a predetermined second capacitance. The predetermined first capacitance and the predetermined second capacitance can have the same value or different values. The predetermined second capacitance can be different for at least two connectable additional capacitors.

Emissions reduction unit 15 switches in capacitance unit 154 in order to reduce the conducted emissions of transmission/reception device 12. In that context, depending on what is specified by logic block 151, P-channel high-voltage switch 152 and optionally also N-channel switch 153 are switched on as described below. P-channel high-voltage switch 152 makes possible the suppression, necessary for bus system 1, of terminal 122 for the bus signal CAN_L to $<=-27V$.

Depending on an optimal setting for capacitance unit 154, which setting can be ascertained previously with respect to minimal emissions either by laboratory investigation or by series trimming, the at least one additional capacitor can be switched on or off using N-channel switch 153 while P-channel high-voltage switch 152 is switched to being conductive. The output of logic block 151 is thus permanently parameterized after laboratory investigation or after series trimming, with the result that the base capacitor that is present is always switched on, and at least one connectable additional capacitor of capacitance unit 154 is optionally switched on. In other words, P-channel high-voltage switch 152 is switched on, and N-channel switch 153 is also switched on as necessary, in order to switch in the at least one connectable additional capacitor of capacitance unit 154.

As a consequence thereof, a current I_CAN_H into terminal 121 for the bus signal CAN_H in the context of switching operations of the bus signal on bus 40 is greatly reduced. As a result, the current I_CAN_H into terminal 121 for the bus signal CAN_H can be adapted to the current I_CAN_L into terminal 122 for the bus signal CAN_L.

The effect of transmission/reception device 12 is thus to compensate for different currents I_CAN_H, I_CAN_L that are caused by a considerably larger P-channel standoff apparatus (transistor 1252) at terminal 121 for bus wire 41 as compared with an N-channel standoff apparatus (transistor 1262) at terminal 122 for bus wire 42. The P-channel standoff apparatus is selected to be considerably larger than the N-channel standoff apparatus so that the two apparatuses have, in the switched-on state, the same resistance Rdson. This compensates for the effect of the parasitic gate-drain capacitances 1253, 1263 because of those apparatuses 1252, 1262 and because of polarity protector diode 129 which must be introduced into the CANL path of the transmission stage due to the CAN specification's requirement for a maximum rating of −27 V.

Figure 3:
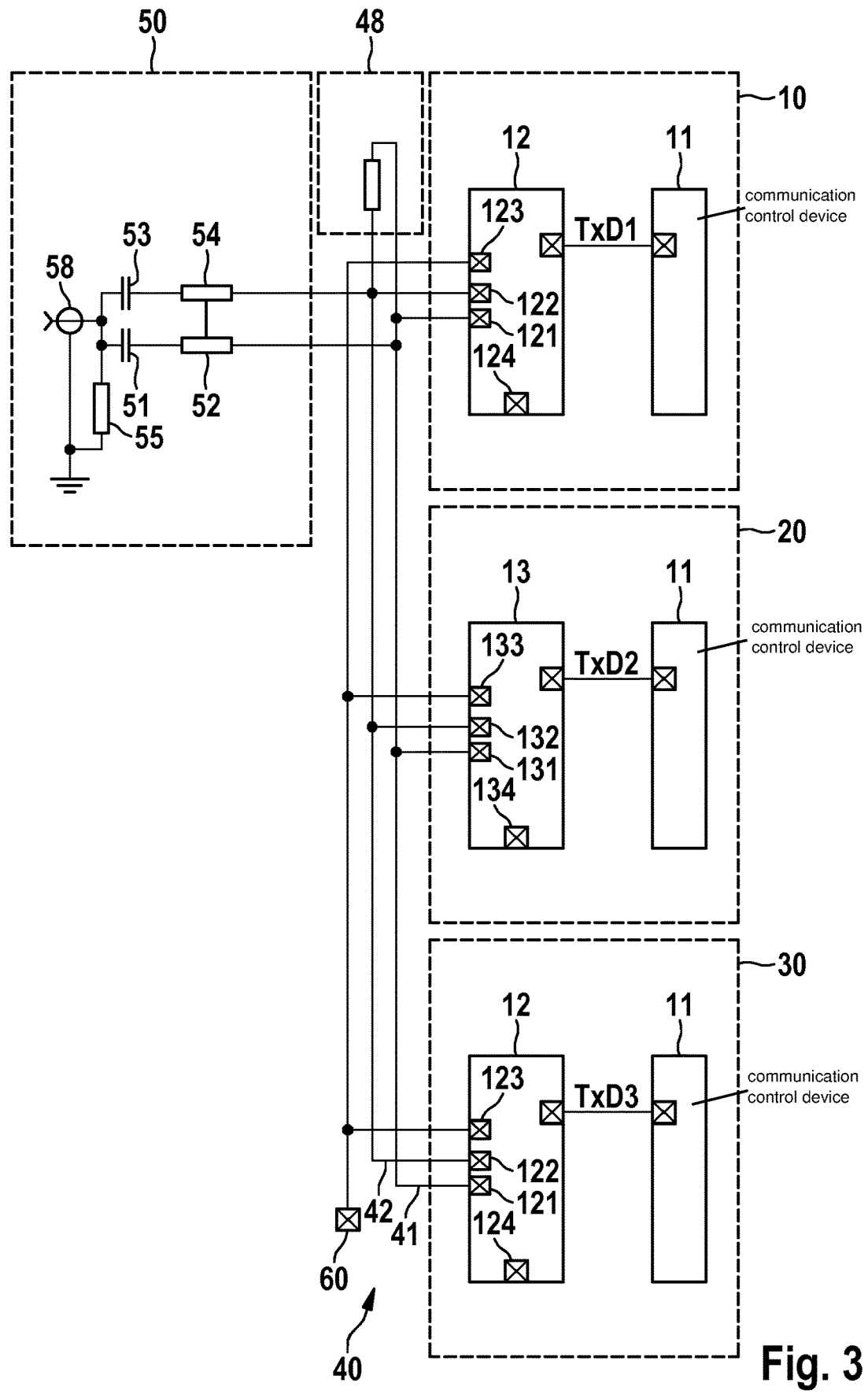
FIG. 3 is a circuit diagram of an outcoupling network for an emissions measurement of a transmission/reception device in the bus system, according to the first exemplifying embodiment of the present invention.

The emissions for transmission/reception devices 12, 13 can be measured using an outcoupling network 50 according to FIG. 3 on the two bus wires 41, 42 of bus 40. Outcoupling network 50 has a first series circuit made up of a first capacitor 51 and a first resistor 52. Resistor 52 is connected at its other end to first bus wire 41 for the bus signal CAN_H. Outcoupling network 50 furthermore has a second series circuit made up of a second capacitor 53 and a second resistor 54. Resistor 54 is connected at its other end to second bus wire 42 for the bus signal CAN_L. First and second capacitors 51, 53 are respectively connected at their other end to a resistor 55 that is connected at its other end to ground. A voltage measuring device 58 is connected in parallel with resistor 55.

As shown in FIG. 3, bus 40 is terminated with resistor 48 between the two bus wires 41, 42. A voltage V_CAN_Supply for transmission/reception devices 12, 13 is fed in from a terminal 60.

Transmission/reception devices 12 of subscriber stations 10, 30 are respectively connected at terminal 121 to bus wire 41. Transmission/reception devices 12 are furthermore respectively connected at terminal 122 to bus wire 42. Terminals 123, 124 of transmission/reception device 12 are occupied as described above with reference to FIG. 2.

Transmission/reception device 13 of subscriber station 20 is similarly connected at a terminal 131 to bus wire 41. Transmission/reception device 13 is furthermore connected at a terminal 132 to bus wire 42. The voltage V_CAN_Supply for transmission/reception device 13 is fed in at a terminal 133. Transmission/reception device 12 is connected at a terminal 134 to the ground of bus system 1, in particular to CAN_GND.

The configuration shown in FIG. 3 and described above corresponds to the configuration that is stipulated in the document IEC TS 62228 Integrated Circuits—EMC Evaluation of CAN Transceivers, in the context of EMC measurement. Three transmission/reception devices 12, 13 on the same CAN bus 40 are thus operated with a shared terminating resistor 48 having a resistance value of 60 ohm, and with outcoupling network 50. One of transmission/reception devices 12 transmits, controlled via a transmission signal TxD1; the other transmission/reception devices 12, 13 are in the same operating mode but are not transmitting a dominant bit or a dominant signal state, so that their respective transmitted signals TxD2, TxD3 are high=recessive. FIG. 3 shows a special example of this.

The respective emissions reduction unit 15 in transmission/reception devices 12 produces the reduced current I_CAN_H, which is adjusted to the lower current I_CAN_L in bus pins or terminals 121, 122, 131, 132 of the two receiving transmission/reception devices 12, 13, as described previously with reference to transmission/reception device 12.

The result of this is to produce a massive improvement in the emissions level in transmission/reception device 12, compared with transmission/reception device 13 that does not have an emissions reduction unit 15. The result is that the greatly elevated emission levels that are measurable with transmission/reception device 13 do not occur in the context of EMC certification, and also subsequent operation, of transmission/reception device 12.

A method for reducing conducted emissions is thus executed with transmission/reception device 12 with the aid of emissions reduction unit 15.

According to a second exemplifying embodiment of the present invention, additional capacitance unit 154 is switched in only when transmission/reception device 12 is in the recessive state. In this case transmission/reception device 12 detects a recessive level, or recessive state 110, both at the output of reception comparator 1200 in reception stage 120 and in transmitted signal TxD. Logic block 151 evaluates such a case to mean that switch 152 is to be switched on.

Transmission/reception device 12 of subscriber station 10 or 30, constituting a receiving subscriber station, thus produces less of a contribution to the emissions spectrum.

According to a third exemplifying embodiment of the present invention, transmission/reception device 12 in bus system 1 is intended to implement a transmitting subscriber station for subscriber station 10. Consideration is also given to the case in which, because of a dominant state 111 of transmitted signal TxD, bus 40 is to be driven for a dominant bus state. In this case additional capacitance unit 154 would disadvantageously impair the switching time behavior of the bus signal. Logic block 151 therefore decides, in the case of such a transmission instruction, that additional capacitance unit 154 will not be switched in. Switch 152 therefore is, or remains, switched off.

For the case in which bus 40 is not to be driven on the basis of a recessive state 110 of the transmitted signal TxD, logic block 151 decides that additional capacitance unit 154 is to be switched in. Switch 152 therefore is, or remains, switched on.

A method for reducing conducted emissions is executed in this manner as well using transmission/reception device 12 and its emissions reduction unit 15.

All the above-described embodiments of emissions reduction unit 15 of transmission/reception devices 12, of subscriber stations 10, 30, of bus system 1, and of the method executed therein according to the first and the second exemplifying embodiment can be utilized individually or in all possible combinations.

The following combinations, in particular, are additionally possible:

According to a modification of the exemplifying embodiments of the present invention, the above-described switching in of capacitance unit 154 can encompass the fact that, in principle, the base capacitor is switched in as described with reference to the first exemplifying embodiment, and only at least one additional capacitor is switched in, depending on a transmitted signal or state of transmission/reception device 12, as described with reference to the second or third exemplifying embodiment. A further circuit block, which encompasses evaluation of emissions during ongoing operation, can be used for this. The capacitance value of the respectively required additional capacitor(s) of capacitance unit 154 can be ascertained from that evaluation.

The above-described bus system 1 in accordance with the exemplifying embodiments is described with reference to a bus system based on the CAN protocol. Bus system 1 according to the first and/or second exemplifying embodiment can, however, be another type of communication network. It is advantageous, but not an obligatory prerequisite, that exclusive, collision-free access by a subscriber station 10, 20, 30 to bus 40, or to a shared channel of bus 40, be guaranteed at least for specific time spans in the context of bus system 1.

Bus system 1 according to the exemplifying embodiments and modifications thereof is, in particular, a CAN network or a CAN HS network or a CAN FD network or a FlexRay network. Bus system 1 can, however, be another serial communication network.

The number and disposition of subscriber stations 10, 20, 30 in bus system 1 according to the exemplifying embodiments and modifications thereof is arbitrary. In particular, only subscriber stations 10 or subscriber stations 20 or subscriber stations 30 can be present in bus systems 1 of the first or the second exemplifying embodiment. Independently thereof, only emissions reduction units 15 that are configured according to one of the previous different variant embodiments can be present.

The functionality of the above-described exemplifying embodiments can be implemented in a transceiver or a transmission/reception device 12, 13, or a transceiver or a CAN transceiver, or a transceiver chipset, or a CAN transceiver chipset, etc. Additionally or alternatively, it can be integrated into existing products. It is possible in particular for the functionality in question either to be realized in the transceiver as a separate electronic module (chip) or to be embedded in an integrated overall solution in which only one electronic module (chip) is present.

What is claimed is:

1. A transmission/reception device for a bus system, comprising:
   a transmission stage including a first transmission block and a second transmission block, the first transmission block being configured to transmit a transmitted signal onto a first bus wire of a bus of the bus system, in which bus system exclusive, collision-free access by a subscriber station to the bus of the bus system is at least temporarily guaranteed, and the second transmission block being configured to transmit the transmitted signal onto a second bus wire of the bus;
   a reception stage for receiving a bus signal transferred on the first and second bus wires; and
   an emissions reduction unit to control switching in of a capacitance unit in parallel with the second transmission block to reduce conducted emissions of the transmission/reception device;
   wherein the first transmission block has a low-voltage P-type metal oxide semiconductor (PMOS) transistor and a P-channel high-voltage standoff transistor, which are connected in series, wherein a parasitic capacitance forms between a gate and a drain of the P-channel high-voltage standoff transistor, wherein the parasitic capacitance is a gate-drain capacitance of the P-channel high-voltage standoff transistor, so that the parasitic capacitance forms between the gate of the P-channel high-voltage standoff transistor and a terminal for the first bus wire.

2. The transmission/reception device as recited in claim 1, wherein the capacitance unit has a base capacitor and at least one additional capacitor, and wherein the emissions reduction unit is configured so that each of the at least one additional capacitor is connectable, independently of another additional capacitor, in parallel with the second transmission block, with a result that the capacitance unit is connectable at least partly in parallel with the second transmission block.

3. The transmission/reception device as recited in claim 2, wherein the emissions reduction unit includes:
   a logic block to evaluate the transmitted signal and a signal received from the bus;
   a P-channel high-voltage switch to switch on a path to an N-channel switch, which is provided for switching the additional capacitors of the capacitance unit, on or off based on evaluation result of the logic block.

4. The transmission/reception device as recited in claim 1, wherein the emissions reduction unit is configured to switch in the capacitance unit at least partly in parallel with the second transmission block, depending on whether a dominant state of the transmitted signal occurs.

5. The transmission/reception device as recited in claim 4, further comprising:
   a standoff apparatus in the second transmission block which is smaller than a standoff apparatus that is provided in the first transmission block.

6. The transmission/reception device as recited in claim 5, wherein the second standoff apparatus is an N-channel standoff transistor.

7. The transmission/reception device as recited in claim 1, wherein the emissions reduction unit is configured to connect the capacitance unit at least partly in parallel with the second transmission block when the transmission/reception device is in a recessive state.

8. The transmission/reception device as recited in claim 1, wherein the transmission/reception device is a Controller Area Network Flexible Data-rate (CAN FD) transmission/reception device.

9. The transmission/reception device as recited in claim 1, wherein the second transmission block has a low-voltage N-type metal oxide semiconductor (NMOS) transistor and an N-channel high-voltage standoff transistor, which are connected in series, wherein a parasitic capacitance forms between a gate and a drain of the N-channel high-voltage standoff transistor, wherein the parasitic capacitance is the gate-drain capacitance of the N-channel high-voltage standoff transistor, so that the parasitic capacitance forms between the gate of the N-channel high-voltage standoff transistor and a cathode of a polarity protector diode, which is for a terminal for the second bus wire.

10. A bus system, comprising:
    a bus; and
    at least two subscriber stations that are connected to one another via the bus so that they can communicate with one another, at least one of the at least two subscriber stations having a transmission/reception device, wherein the transmission/reception device includes:
    a transmission stage including a first transmission block and a second transmission block, the first transmission block being configured to transmit a transmitted signal onto a first bus wire of a bus of the bus system, in which bus system exclusive, collision-free access by a subscriber station to the bus of the bus system is at least temporarily guaranteed, and the second transmission block being configured to transmit the transmitted signal onto a second bus wire of the bus;
    a reception stage for receiving a bus signal transferred on the first and second bus wires; and
    an emissions reduction unit configured for controlled switching in of a capacitance unit in parallel with the second transmission block to reduce conducted emissions of the transmission/reception device;
    wherein the first transmission block has a low-voltage P-type metal oxide semiconductor (PMOS) transistor and a P-channel high-voltage standoff transistor, which are connected in series, wherein a parasitic capacitance forms between a gate and a drain of the P-channel high-voltage standoff transistor, wherein the parasitic capacitance is a gate-drain capacitance of the P-channel high-voltage standoff transistor, so that the parasitic capacitance forms between the gate of the P-channel high-voltage standoff transistor and a terminal for the first bus wire.

11. A method for reducing conducted emissions, the method comprising:
    transmitting, with the first transmission block, a transmitted signal onto a first bus wire of a bus, wherein the method is performed using a transmission/reception device for a bus system in which exclusive, collision-free access by a subscriber station to the bus of the bus system is at least temporarily guaranteed, and wherein the transmission/reception device includes a transmission stage that has a first transmission block and a second transmission block, a reception stage, and an emissions reduction unit;
    transmitting, with the second transmission block, the transmitted signal onto a second bus wire of the bus;
    receiving, with the reception stage, a bus signal transferred on the first and second bus wires; and controlling, with the emissions reduction unit, a switching in of a capacitance unit in parallel with the second transmission block to reduce conducted emissions of the transmission/reception device;

wherein the first transmission block has a low-voltage P-type metal oxide semiconductor (PMOS) transistor and a P-channel high-voltage standoff transistor, which are connected in series, wherein a parasitic capacitance forms between a gate and a drain of the P-channel high-voltage standoff transistor, wherein the parasitic capacitance is a gate-drain capacitance of the P-channel high-voltage standoff transistor, so that the parasitic capacitance forms between the gate of the P-channel high-voltage standoff transistor and a terminal for the first bus wire.

* * * * *